United States Patent
Arackellian et al.

[11] Patent Number: 5,842,070
[45] Date of Patent: Nov. 24, 1998

[54] ADJUSTABLE LIGHT SHUTTER FOR HAND HELD ELECTRO-OPTICAL SCANNERS

[75] Inventors: Kevork G. Arackellian, Everett; Craig J. Cornelius, Woodinville, both of Wash.

[73] Assignee: Intermec Corporation, Everett, Wash.

[21] Appl. No.: 902,663

[22] Filed: Jul. 30, 1997

Related U.S. Application Data

[62] Division of Ser. No. 347,050, Nov. 30, 1994, abandoned.
[51] Int. Cl.⁶ .................................................. G03B 17/24
[52] U.S. Cl. .......................................... 396/463; 396/470
[58] Field of Search ................................... 396/462, 463, 396/470

[56] References Cited

U.S. PATENT DOCUMENTS

| | | | |
|---|---|---|---|
| 3,191,516 | 6/1965 | Corcoran | 396/463 |
| 3,581,646 | 6/1971 | Saunders et al. | |
| 3,918,077 | 11/1975 | Burton et al. | |
| 4,060,313 | 11/1977 | Kondo | 396/463 |
| 4,286,856 | 9/1981 | McGrath | |
| 4,301,374 | 11/1981 | Hashiue | |
| 4,333,722 | 6/1982 | Lee | |
| 4,571,629 | 2/1986 | Horio et al. | |
| 4,675,747 | 6/1987 | Hamma et al. | |
| 4,717,935 | 1/1988 | Anacreon | |
| 4,965,671 | 10/1990 | Dielhof | |
| 5,159,382 | 10/1992 | Lee et al. | |
| 5,337,110 | 8/1994 | Dowe | |
| 5,432,576 | 7/1995 | SanGregory et al. | |

*Primary Examiner*—David M. Gray
*Attorney, Agent, or Firm*—Graham & James LLP

[57] ABSTRACT

A shutter for use in an electro-optical scanning device having an aperture and a CCD imager is provided. The shutter comprises a light barrier movable between a first position blocking light from passing through the aperture and a second position enabling light to pass through the aperture. The light barrier has a magnetic portion. An inductive coil is disposed relative to the magnetic portion of the light barrier to cause movement of the light barrier between the first and second positions by application of an electric current to the inductive coil. The inductive coil is disposed concentrically around the aperture, and the light barrier comprises a magnet that is coupled to a torsional wire disposed within the inductive coil. The torsional wire has a bias that returns the light barrier from the second position to the first position. Alternatively, the light barrier is moveable either pivotally, rotationally, or axially relative to the aperture, and further comprises a corresponding iris. The corresponding iris aligns with the aperture upon the light barrier being pivoted, rotated or axially moved to the second position.

8 Claims, 4 Drawing Sheets

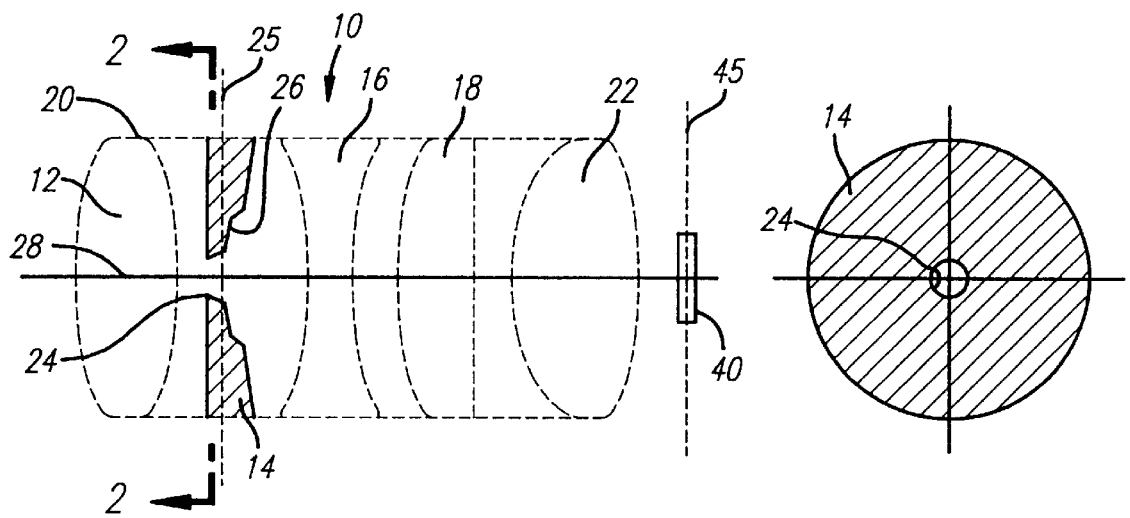
FIG. 1
PRIOR ART
FIG. 2
PRIOR ART
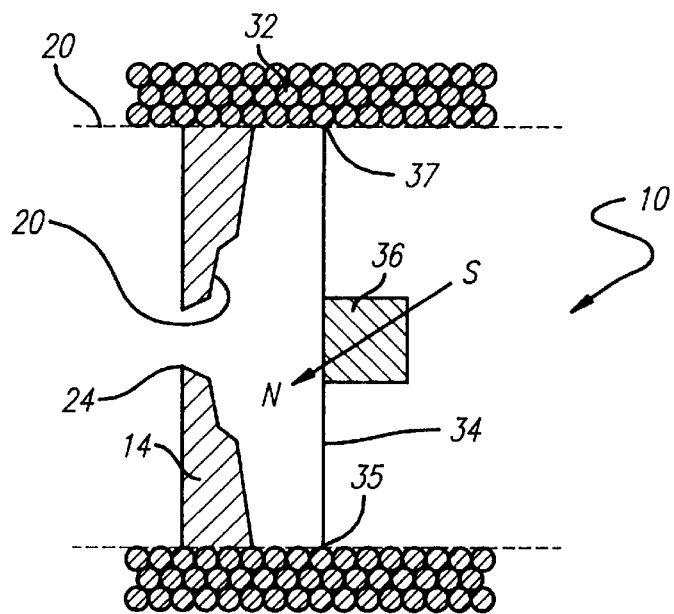
FIG. 3

ADJUSTABLE LIGHT SHUTTER FOR HAND HELD ELECTRO-OPTICAL SCANNERS

This is a divisional of application Ser. No. 08/347,050 filed on Nov. 30, 1994 now abandoned.

BACKGROUND OF THE INVENTION

1. Field of the Invention

The present invention relates to electro-optical scanners for reading data symbols, and more particularly, to an adjustable light shutter that permits controlled exposure time for scanners that operate in a high background light environment.

2. Description of Related Art

Electro-optical imaging systems are commonly used to decipher data symbols printed on objects in order to identify the objects. A bar code symbol represents a popular form of data symbology, and typically comprises a pattern of vertical bars of various widths separated by spaces of various widths. Since the bar and space elements have different light reflecting characteristics, a scanner can convert the symbology into an electrical signal by analyzing the light reflected from the symbol. The electrical signal can then be decoded into an alphanumeric representation of the symbol which identifies the object. Bar code symbology of this nature is commonly used in various applications, such as inventory control, point of sale identification, or logistical tracking systems.

A type of electro-optical scanner uses laser light that is scanned across a bar code field. Since the bar code symbol is often disposed on the object to be identified, it is desirable for the scanner to be included in a hand held or portable device that can be brought to the object and the laser light drawn across the bar code field, such as by use of a light pen. Alternatively, a bar code scanner may include movable mirrors that articulate the laser light back and forth at a high rate to scan across the bar code field. Since the spectral irradiance from a laser is substantially higher than that of background light, it is generally unnecessary to require exposure control to block background light in such laser scanning devices.

It is increasingly desirable within such electro-optical scanning systems to increase the density of the data being conveyed. Conventional one-dimensional bar code symbology has a significant drawback in that it requires a relatively large amount of space to convey a correspondingly small amount of data due in part to the high aspect ratio required by the laser scanner. To increase the amount of information presented, two-dimensional matrix symbologies have been developed that occupy a uniform amount of space with a generally rectangular shape. Instead of bars and spaces, polygonal characters disposed at particular rows and columns of the matrix correspond to the information being conveyed. As a result, a matrix symbology can compress significantly more data into a given amount of space than a conventional one-dimensional bar code.

Such two-dimensional symbology scanners convert the matrix into pixel (picture element) information that can be deciphered into the alphanumeric information represented by the matrix image. Such scanners often utilize charge-coupled device (CCD) imaging technology to convert the optical information from the matrix into an electrical signal representative of the matrix. In a CCD device, the matrix image is focused onto pixels disposed in a plurality of lines across an imaging surface of the CCD imager. The CCD imager holds the image information of the light reflective and absorptive object features in the form of electrical charge accumulated on the individual pixels over time. The data of each of a plurality of lines of pixels is then read from the CCD imager in a sequential manner. A drawback of CCD imagers is their susceptibility to background light that can blur or overexpose the matrix image; if the image focused onto the CCD imager is distorted before all the pixel lines are read, the image may be improperly interpreted. Thus, it is desirable to provide CCD imagers capable of very rapid reading of the pixel information.

One type of two-dimensional CCD imager, known as an interline transfer imager, reads the even (or odd) pixel lines first, followed by the odd (or even) pixel lines. Consequently, interline transfer imagers suffer from an inherent inconsistency in the exposure duration between the even and odd pixel lines. A second type of two-dimensional CCD imager, known as a full frame transfer imager, transfers all the pixel lines in a near simultaneous manner. While full frame transfer imagers have significant advantages over interline transfer imagers in terms of data consistency, full frame transfer imagers also add substantial additional cost and complexity to electro-optical scanning systems, and thus are less desirable.

To make effective use of interline transfer CCD imagers within electro-optical scanners, it is necessary to control the image exposure duration. Image exposure duration is controlled in conventional photography through the use of mechanical shutter systems that regulate the length of time that light is transmitted through an aperture of a focusing element to a light sensitive medium. Unfortunately, mechanical shutter systems common to still photography have a relatively low useful life expectancy due to the ordinary wear on the moving components that would not satisfy the high frequency of use demanded from commercial electro-optical scanners.

To control exposure time within hand held electro-optical scanners, the scanner is placed in close proximity with the scanned surface with shielding disposed around the scanner to prevent undesired exposure to background light. A light source, such as light emitting diodes (LEDs), provides light that reflects off the scanned surface onto the CCD imager. During the exposure time, the electro-optical scanner must be maintained with the CCD imager in a fixed position with respect to the two-dimensional image until all the pixel lines are read from the CCD imager in order to minimize undesirable blurring of the image due to motion of the scanner or the scanned surface. Such constrained usage severely limits the flexibility and versatility of the scanner in that it is not always practical or desirable to bring the electro-optical scanner into such close proximity with the scanned surface. For instance, it may be preferable to scan two-dimensional symbols from a somewhat greater distance while either the scanner or object to be scanned is in motion, or in situations in which there are varying light conditions.

Thus, a critical need exists for a device to control the exposure of a CCD imager that enables extremely short and reliable exposure duration. Such a device would provide greater flexibility and versatility to hand held electro-optical imaging systems.

SUMMARY OF THE INVENTION

In accordance with the teachings of this invention, an adjustable duration shutter for use in an optical device is provided. The optical device comprises an optical axis that extends axially through an aperture stop. The optical axis further intersects perpendicularly with both an aperture plane and an image plane. The aperture plane may coincide with the aperture stop, or may be closely adjacent thereto. The shutter comprises a light barrier adjacent to either the aperture plane or the image plane, and that is movable between a first position blocking light from passing along the optical axis and a second position enabling the light to pass to a CCD imager.

More particularly, the light barrier has a permanent magnet portion and an inductive coil spaced from the permanent magnet portion. Application of an electric current to the inductive coil produces a magnetic field that induces movement of the light barrier between the first and second positions. The permanent magnet portion moves in order to align its magnetic field with the induced magnetic field.

In a first embodiment of the invention, the inductive coil is disposed concentrically around the optical axis. The light barrier is coupled to a torsional wire disposed within the inductive coil. The torsional wire has a bias that returns the light barrier from the second position to the first position once the magnetic field has collapsed.

In a second embodiment of the invention, the light barrier is pivotally disposed relative to either the aperture plane or the image plane, and further comprises a corresponding iris. The corresponding iris aligns with the optical axis upon the light barrier being pivoted from the first position to the second position.

In a third embodiment of the invention, the light barrier comprises a rotatably movable pin having a corresponding bore that extends radially therethrough. The corresponding bore aligns with the optical axis upon rotation of the pin from the first position to the second position.

In a fourth embodiment of the invention, the light barrier comprises an axially movable pin having a corresponding bore that extends radially therethrough. The corresponding bore aligns with the optical axis upon axial movement of the pin from the first position to the second position.

In a fifth embodiment of the invention, the light barrier comprises a rotationally movable blade extending radially from a shaft of a stepper motor. The blade aligns with the optical axis upon rotation of the stepper motor shaft from the first position to the second position.

A more complete understanding of the adjustable light shutter for hand held electro-optical scanners will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a side sectional view of a prior art aperture and focusing system for an electro-optical scanner;

FIG. 2 is an end view of the prior art aperture, as taken through the section 2—2 of FIG. 1;

FIG. 3 is a side sectional view of a first embodiment of an adjustable light shutter of the present invention;

DETAILED DESCRIPTION OF THE PREFERRED EMBODIMENT

Figure 4A:
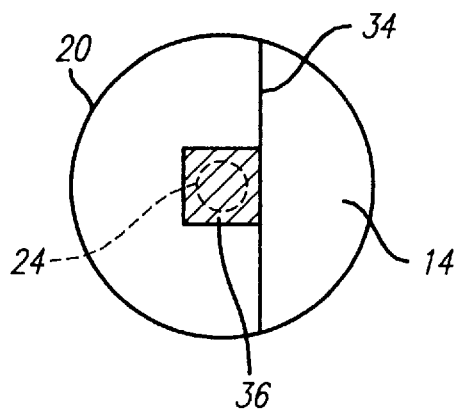
FIGS. 4A and 4B are end views of the first embodiment of the adjustable light shutter illustrating the shutter in a closed and an open position, respectively.

The present invention provides an electromagnetic shutter device for controlling the exposure of a CCD imager, enabling controlled exposure duration. The shutter device provides greater flexibility and versatility to hand held electro-optical imaging systems.

Referring first to FIGS. 1 and 2, a focusing system 10 for a prior art electro-optical scanner is illustrated. The focusing system 10 comprises a plurality of lenses 12, 16, 18 and 22, all disposed within a sleeve 20 concentric with a central aperture axis 28. An aperture 14 is disposed in an aperture plane 25 and has an iris 24 centered on the optical axis 28. The iris 24 has a funnel-shaped tapered portion 26 that flares outward along the axis 28 in the general direction of the lens 22. A CCD imager 40 is disposed in an image plane 45 at an end of the focusing system 10, with the CCD imager centered on the optical axis 28. The optical axis 28 intersects perpendicularly with both the aperture plane 25 and the image plane 45.

As known in the art, light reflected from a symbol to be scanned passes through the first lens 12 and is converged through the iris 24 of the aperture 14 to the second and third lenses 16, 18. The fourth lens 22 converges the light from the second and third lenses 16, 18, and further focuses the image onto the CCD imager 40. Electro-optical scanners commonly utilize fixed focus lenses that are pre-focused at some object distance typically less than one foot from the scanner, although auto-focus lens systems are also possible. It should also be apparent that the number and type of lenses illustrated are for exemplary purposes, and the actual number and type of lenses utilized will vary depending upon the particular application of the electro-optical scanner.

The iris 24 limits the amount of light that enters the electro-optical scanner and provides the aperture stop for the scanner. In general, the quality or sharpness of an image degrades as the iris size increases to allow a greater amount of light to enter the scanner. If too little light enters the scanner, however, the CCD imager would be unable to form a satisfactory image without increasing the exposure time, which increases its susceptibility to motion blur. Therefore, selection of the iris size represents a trade-off between image sharpness and light intensity.

Referring now to FIGS. 3 and 4, a first embodiment of the shutter mechanism of the present invention is illustrated. In the first embodiment, an inductive coil 32 is wound around the sleeve 20 of the focusing element 10 in a region adjacent to the aperture 14. A torsional wire 34 extends between end points 35, 37 disposed along the inside diameter of the sleeve 20, defining a chord segment offset from the iris 24 of the aperture 14. The torsional wire 34 is fixedly secured at the end points 35, 37, respectively, and has a tension that maintains the wire taut. A light barrier 36 is coupled to a central portion of the torsional wire 34 at an edge thereof, and is aligned with the iris 24 of the aperture 14. The barrier 36 is comprised of a permanent magnet material having a diagonally disposed polarity, as illustrated in FIG. 3.

Figure 4B:
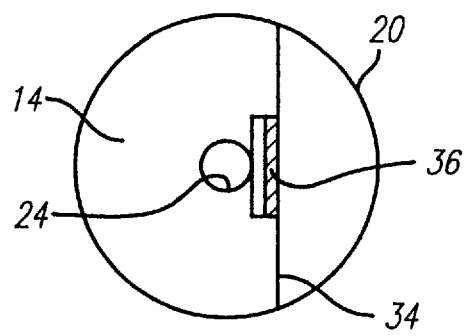

The tension applied to the wire 34 maintains the barrier 36 in a first position generally parallel to the plane of the aperture 14 as illustrated in FIG. 4A. In this first position, the barrier 36 blocks light from passing to the CCD imager 40, preventing the CCD imager from receiving any optical image. By application of an electrical current to the inductive coil 32, an axially directed magnetic field is defined within the focusing structure 10, causing the barrier 36 to pivot 90° along an axis defined by the wire 34 against the bias of the wire tension to a second position generally perpendicular to the aperture plane 25, as illustrated in FIG. 4B. In the second position, the barrier 36 no longer blocks light from passing through the iris 24, allowing an optical image to pass to the CCD imager 40. Once the electrical current to the inductive coil 32 is interrupted, the axially directed magnetic field collapses, causing the barrier 36 to rapidly return to the first position by the bias due to the tension on the wire 34.

As shown in FIGS. 3 and 4A, the barrier 36 has a generally rectangular shape that is conducive to attachment of the barrier to the wire 34 along an edge of the barrier; however, it should be apparent that alternative shapes, including but not limited to square, circular, and/or polygonal, can also be advantageously utilized, as long as the barrier is capable of completely blocking light from passing through the iris 24 when disposed in the second position. The cone of light passing through the iris 24 has its smallest cross-sectional area at the aperture plane 25, and increases in area downstream from the iris. Accordingly, the barrier 36 should be placed as close as possible to the aperture plane 25, as illustrated in FIG. 3, so that it would only need a small area to completely block all the light that emanates from the iris 24. It should be apparent that a small area barrier 36 would have proportionately less weight, and would be moved between the first and second positions more easily and with less force. Another advantage of disposing the barrier 36 close to the aperture plane 25 is that the barrier could be only partially opened, effectively changing the size of the iris 24. Alternatively, the barrier could be placed adjacent to the image plane 45 so as to block all the light from entering the CCD imager 40, and should have an area sufficient to prevent any light from passing to the CCD imager.

The duration that the barrier 36 remains in the second position defines the exposure time of the CCD imager 40, and can be accurately controlled by varying the width of the electrical current pulse applied to the inductive coil 32. It should be readily apparent to those skilled in the art that extremely short CCD imager exposure time can be achieved through use of the above shutter, such as on the order of less than one millisecond.

Figure 5:
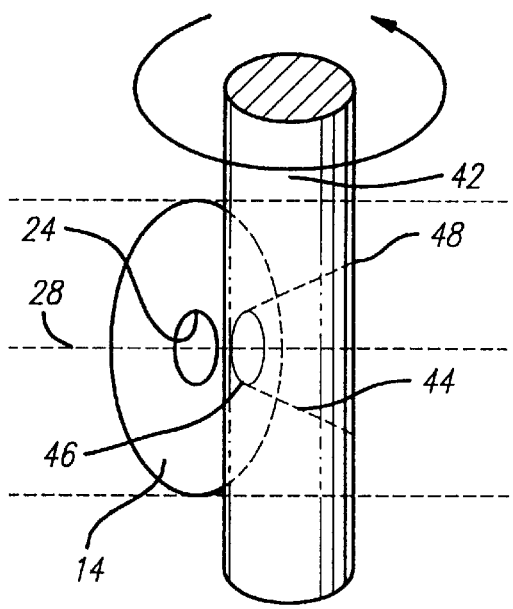
FIG. 5 is a perspective view of a second embodiment of an adjustable light shutter of the present invention.
Figure 6:
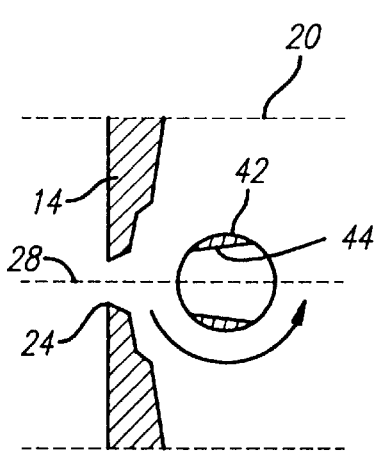
FIG. 6 is a sectional view of the second embodiment of the adjustable light shutter.
Figure 7:
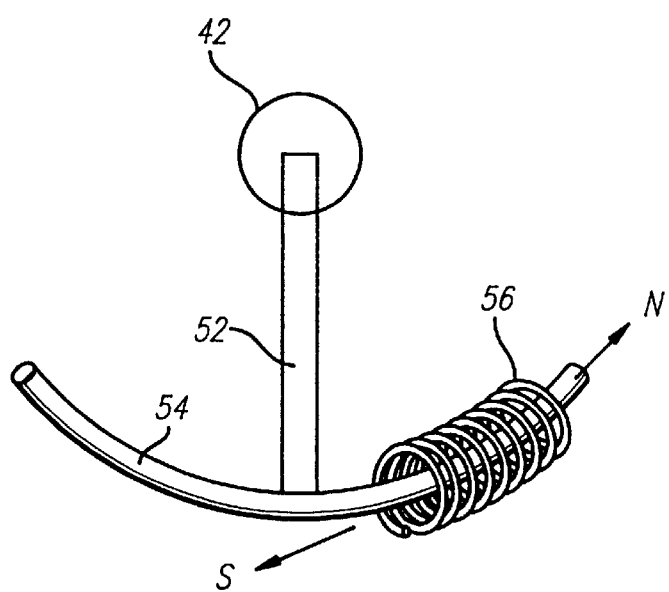
FIG. 7 is a top view of the second embodiment of the adjustable light shutter.

FIGS. 5, 6 and 7 illustrate a second embodiment of the shutter mechanism of the present invention. A cylindrical pin 42 is disposed behind the aperture 14 adjacent to the aperture plane 25 and passes perpendicularly through the axis 28. The pin 42 has a funnel shaped bore 44 that extends radially through the pin. The funnel shaped bore 44 has a narrow diameter end 46 and a wide diameter end 48. The pin 42 can be rotated so that the narrow diameter portion 46 is aligned with the iris 24 of the aperture 14, permitting light from the iris to be transmitted to the CCD imager 40. Further rotation of the pin 42 by 90° places the bore 44 in a position perpendicular with the axis 28 so that an outer surface of the pin 42 faces the iris 24. In this second position of the pin 42, light passing through the iris 24 is blocked so as to prevent an image from forming onto the CCD imager 40.

Selective rotation of the pin 42 is accomplished by the use of a crank arm 52 that extends perpendicularly from a portion of the pin. The crank arm 52 connects to an arcuate-shaped member 54 comprising a permanent magnet. An inductive coil 56 is wound around a portion of the arcuate-shaped member 54. Application of an electrical current to the inductive coil 56 produces an axially directed magnetic field that causes the member 54 to move in an arcuate path, thus rotating the pin 42. The pin can be returned to its original position either by reversing the polarity of the electric current applied to the inductive coil 56, or by other conventional return mechanism, such as a spring.

The duration that the pin 42 remains in the second position defines the exposure time of the CCD imager 40, and can be accurately controlled by varying the width of the electrical current pulse applied to the inductive coil 56. As in the first embodiment, the pin 42 could be placed adjacent to the image plane 45 so as to block all the light from entering the CCD imager 40. It would be necessary to reverse the orientation of the pin 42, so that the narrow diameter portion 46 is pointed toward the CCD imager 40, permitting light from the iris to be transmitted to the CCD imager while in the second position.

Figure 8:
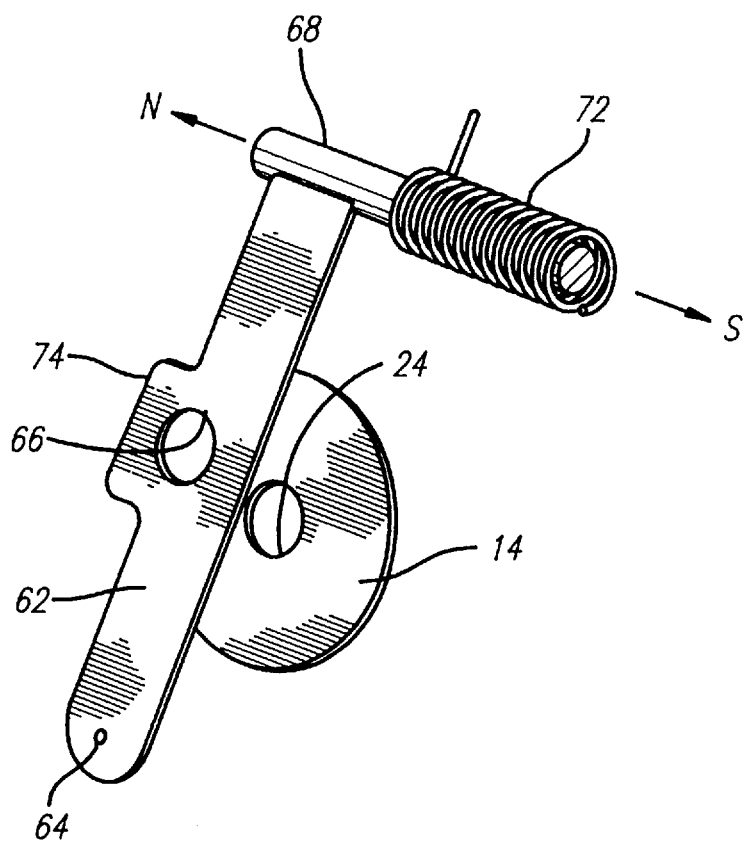
FIG. 8 is a perspective view of a third embodiment of an adjustable light shutter of the present invention.

FIG. 8 illustrates a third embodiment of the shutter mechanism of the present invention. A thin strip 62 is disposed behind the aperture 14 adjacent to the aperture plane 25, and has a pivot point 64 enabling a pivoting motion of the strip relative to the aperture 14. The strip 62 has a corresponding iris 66 disposed at a wide central portion 74 of the strip. Pivoting of the strip 62 relative to the aperture 14 enables a variety of positions of the corresponding iris 66 relative to the aperture axis 82 and iris 24. In one position, the corresponding iris 66 aligns with the iris 24, enabling light to pass through the strip 62 to the CCD imager 40. On either side of the corresponding iris 66, a solid portion of the strip 62 can be positioned so as to block the light passing through the iris 24. Thus, as the strip 62 pivots in a single direction relative to the aperture 14, such as from left to right, the iris 24 is first blocked, then becomes opened, then becomes blocked once again. The rate at which the strip 62 pivots determines a dwell time for which the corresponding iris 66 and iris 24 are aligned to allow light to pass to the CCD imager 40.

Pivoting motion of the strip 62 is enabled by a permanent magnetic element 68 disposed at an end of the strip opposite from the pivot point 64. An inductive coil 72 is wound around a portion of the permanent magnet element 68. As in the previous embodiments, application of an electrical current to the inductive coil 72 produces a magnetic field directed along the axis of the inductive coil that moves the permanent magnet in the axial direction. The permanent magnet element 68 and strip 62 can return to the original position by reversing polarity of the current applied to the inductive coil 72, or by other conventional return mechanism, such as a spring. As in the previous embodiments, the strip 62 could be placed adjacent to the image plane 45 so as to block all the light from entering the CCD imager 40.

Figure 9:
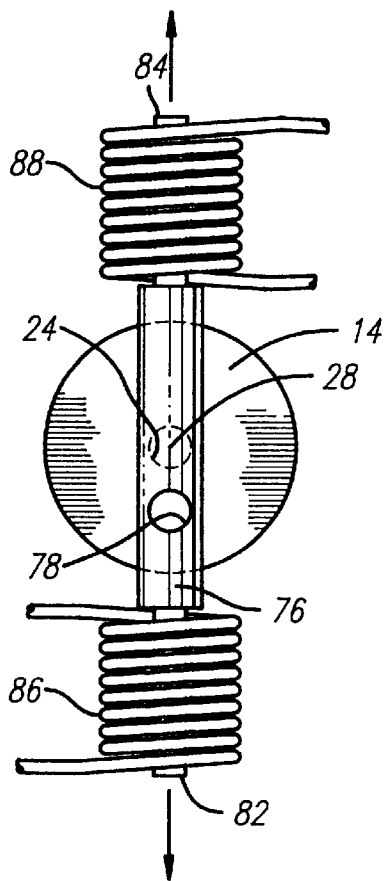
FIG. 9 is an end view of a fourth embodiment of an adjustable light shutter of the present invention.

A fourth embodiment of the shutter mechanism of the present invention is illustrated in FIG. 9. A pin 76 is disposed behind the aperture 14 adjacent to the aperture plane 25 and perpendicularly with the axis 28. A bore 78 extends radially through the pin 76. Unlike the embodiment of FIGS. 5, 6 and 7, the pin 76 is movable along its axis, and does not rotate. A pair of inductive coils 86, 88 are disposed at respective ends 82, 84 of the pin 76. Axial movement of the pin 76 moves the bore 78 into a position in substantial alignment with the iris 24 of the aperture 14. Continued axial movement of the pin 76 causes the bore 78 to move passed the iris 24, into a position in which the iris is blocked by the pin 76. The ends 82, 84 of the pin 76 comprise permanent magnet material.

Application of an electrical current to either or both of the inductive coils 86, 88 provides movement of the pin 76 along its axis to selectively position the bore 78 relative to the iris 24. The pin 76 can be returned in the opposite direction either by reversing a polarity of electric current applied to the inductive coils 86, 88, or by other conventional return mechanism, such as a spring. Alternatively, one of the inductive coils 86, 88 can be configured to impart an axial force on an associated one of the ends 82, 84 in a first direction for movement of the pin 76 from the first position to the second position, and the other one of the inductive coils can be configured to impart an opposite axial force on the other associated one of the ends in a second direction for movement of the pin 76 from the second position to the first position. As in the previous embodiments, the pin 76 could be placed adjacent to the image plane 45 so as to block all the light from entering the CCD imager 40.

Figure 10:
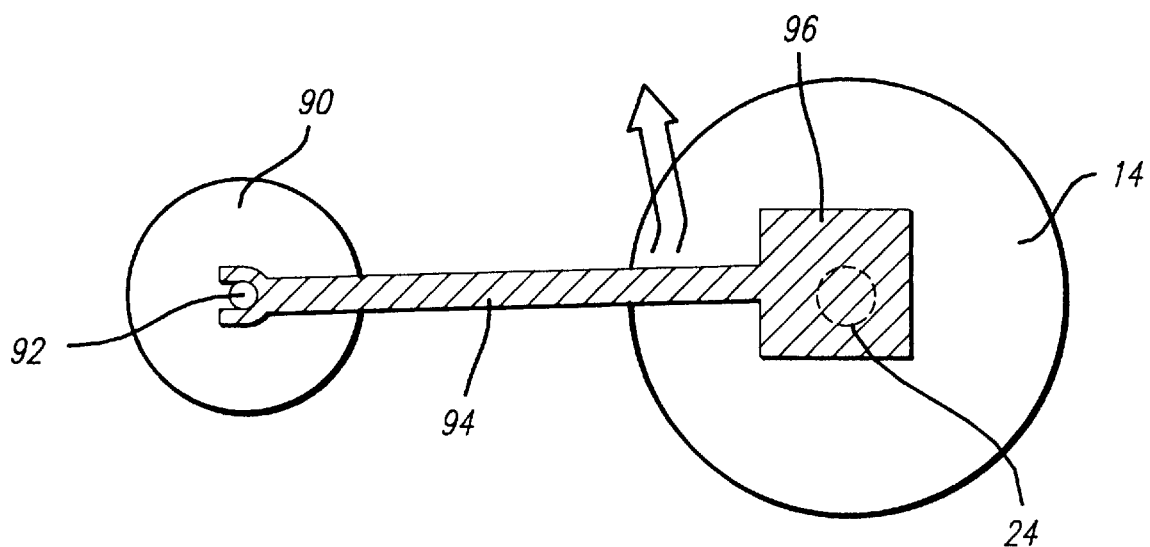
FIG. 10 is an end view of a fifth embodiment of an adjustable light shutter of the present invention.

A fifth embodiment of the shutter mechanism of the present invention is illustrated in FIG. 10. A stepper motor 90 is disposed alongside the aperture 14, and has a shaft 92 extending in a direction parallel to the optical axis 28. An armature 94 is coupled to the shaft 92 and extends normally from the shaft in a plane parallel to the aperture plane 25. A barrier 96 is provided at an end of the armature 94 opposite from the shaft 92, such that it can completely block light from passing through the iris 24 of the aperture 14. The armature 94 and barrier 96 may be unitarily formed, and comprised of a lightweight material, such as aluminum.

Application of an electrical current to the stepper motor 90 causes rotation of the shaft 92 which pivots the armature 94 in discrete increments until the barrier 96 no longer blocks the iris 24. Once it has pivoted out of the way of the iris 24, light is permitted to pass from the iris 24 to the CCD imager 40. The barrier 96 can be returned to the blocking position either by continued rotation in the same direction of the shaft 92 by continued application of an electrical current to the stepper motor 90. Alternatively, the current applied to the stepper motor 90 can be reversed to reverse the direction of rotation of the shaft 92 and return the barrier 96 to the blocking position relative to the iris 24. As in the previous embodiments, the barrier 96 could also be placed adjacent to the image plane 45 so as to block all the light from entering the CCD imager 40.

Figure 11:
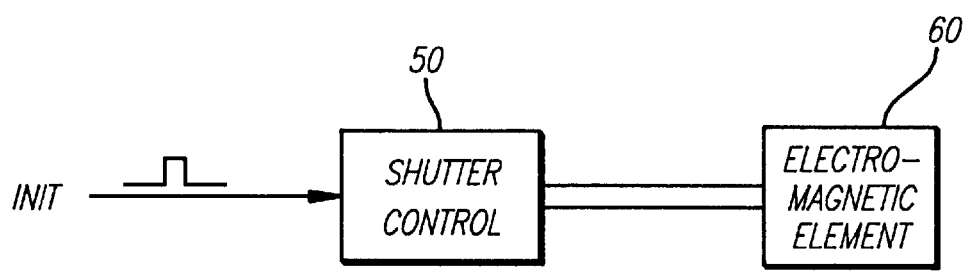
FIG. 11 is a block diagram illustrating control of the adjustable light shutter.

Operation of the electro-optical scanner will now be described with reference to the block diagram of FIG. 11. Assuming that the electro-optical scanner is utilized to image a two-dimensional matrix, the operator of the scanner initiates operation by commanding the opening of the shutter mechanism to allow light to pass to the CCD imager. An INIT command is generated by known electrical technique and is applied to a shutter control device 50 that generates an electrical current. The electrical current is applied to the inductive coils of an associated one of the embodiments of the shutter mechanism described above. For exemplary purposes, electromagnetic element 60 is illustrated in FIG. 11 to represent any of inductive coils 32, 72, 88, 86, 56, or the internal inductive coils of the stepper motor 90. With the shutter in an open position, the pixels of the CCD imager are cleared to prepare the imager for receipt of light from the object. It may be necessary to use a light source, such as LEDs, so that a measurement can be made as to the optimal exposure duration and illumination level for the ambient conditions. Once again, the imager is electrically cleared, and is now ready for imaging the two-dimensional matrix. The LEDs are illuminated for the desired exposure duration and illumination level, and the shutter is closed. The image can then be read from the pixels of the CCD imager and converted to alphanumeric information, as known in the art.

Having thus described a preferred embodiment of an adjustable light shutter for hand held electro-optical scanners, it should be apparent to those skilled in the art that certain advantages of this system have been achieved. It should also be appreciated that various modifications, adaptations, and alternative embodiments thereof may be made within the scope and spirit of the present invention. For example, the shutter is described above for use in conjunction with a CCD imager, but it should be apparent to those skilled in the art that the electromagnetic shutter would be useful in any video imaging application requiring controlled exposure time.

The invention is further defined by the following claims.

What is claimed is:

1. A shutter for use in an optical device having an aperture and a CCD imager, comprising:

a light barrier movable between a first position blocking light that passes through said aperture and a second position enabling light to pass to said CCD imager. said light barrier having a permanent magnet portion attached to a torsional wire extending alone a chord of an outer perimeter of said aperture; and means for electro-magnetically manipulating said light barrier between said first and second positions.

2. The shutter of claim 1, wherein said manipulating means further comprises an inductive coil, whereby application of an electrical current to said inductive coil produces a magnetic field that moves said light barrier about said torsional wire from said first position to said second position.

3. A shutter for use in an optical device having an aperture and a CCD imager, comprising:

a light barrier movable between a first position blocking light that passes through said aperture and a second position enabling light to pass to said CCD imager; and means for electro-magnetically manipulating said light barrier between said first and second positions;

wherein said manipulating means further comprises an inductive coil, whereby application of an electrical current to said inductive coil produces a magnetic field that moves said light barrier from said first position to said second position;

wherein said inductive coil is disposed concentrically around an outer perimeter of said aperture, and a torsional wire extends along a chord of said outer perimeter.

4. The shutter of claim 3, wherein said light barrier further comprising a permanent magnet coupled to said torsional wire.

5. The shutter of claim 3, wherein said torsional wire has a bias that returns said light barrier from said second position to said first position.

6. A shutter for use in an optical device having an aperture and a CCD imager, comprising:

a light barrier movable between a first position blocking light that passes through said aperture and a second position enabling light to pass to said CCD imager, said light barrier having a permanent magnet portion; and an inductive coil disposed concentrically around said aperture, said inductive coil being cooperatively disposed relative to said permanent magnet portion of said light barrier to cause movement of said light barrier between said first and second positions by application of an electric current to said inductive coil.

7. A shutter for use in an optical device having an aperture and a CCD imager. comprising:
   a light barrier movable between a first position blocking light that passes through said aperture and a second position enabling light to pass to said CCD imager, said light barrier having a permanent magnet portion; and
   an inductive coil cooperatively disposed relative to said permanent magnet portion of said light barrier to cause movement of said light barrier between said first and second positions by application of an electric current to said inductive coil;
   wherein said inductive coil is disposed concentrically around said aperture, and said light barrier is coupled to a torsional wire disposed within said inductive coil.

8. A shutter for use in an optical device having an aperture, comprising:
   a light barrier movable between a first position blocking light that passes through said aperture and a second position enabling light to pass through said aperture, said light barrier having a permanent magnet portion; and
   an inductive coil disposed concentrically around said aperture, said inductive coil being cooperatively disposed relative to said permanent magnet portion of said light barrier to cause movement of said light barrier between said first and second positions by application of an electric current to said inductive coil.

* * * * *